US012623785B2

(12) United States Patent
Sobanski et al.

(10) Patent No.: US 12,623,785 B2
(45) Date of Patent: May 12, 2026

(54) OPEN ROTOR PROPULSION SYSTEM WITH EXHAUST MIXER(S)

(71) Applicant: RTX Corporation, Farmington, CT (US)

(72) Inventors: Jon E. Sobanski, Glastonbury, CT (US); Jeffrey T. Morton, Manchester, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/903,168

(22) Filed: Oct. 1, 2024

(65) Prior Publication Data

US 2026/0091873 A1      Apr. 2, 2026

(51) Int. Cl.
*B64D 27/10* (2006.01)
*B64D 33/04* (2006.01)

(52) U.S. Cl.
CPC ............. *B64D 27/10* (2013.01); *B64D 33/04* (2013.01)

(58) Field of Classification Search
CPC ... F02K 1/46; F02K 1/48; F02K 1/386; B64D 27/10; B64D 2027/005
See application file for complete search history.

(56) References Cited

U.S. PATENT DOCUMENTS 4,254,620 A      3/1981 Wright
4,302,934 A      12/1981 Wynosky 4,765,135 A      8/1988 Lardellier
6,502,383 B1 *      1/2003 Janardan ................... F02K 1/46
60/264
10,704,410 B2      7/2020 Zatorski
(Continued)

FOREIGN PATENT DOCUMENTS

DE      3338456 A1      5/1984

OTHER PUBLICATIONS

Anonymous Manufacturer et al: "Pratt & Whitney/Allison 578-DX—Wikipedia", May 14, 2024 (May 14, 2024), pp. 1-14, XP093342511, Retrieved from the Internet: URL:https://en.wikipedia.org/w/index.php?title=Pratt_&_Whitney/Allison_578-DX&oldid=1223793567.

(Continued)

*Primary Examiner* — Andrew H Nguyen
(74) *Attorney, Agent, or Firm* — Getz Balich LLC

(57)      ABSTRACT

An aircraft propulsion system includes a propulsion section and a turbine engine. The propulsion section includes an open propulsor rotor and an open guide vane structure disposed next to the open propulsor rotor. The turbine engine is configured to drive rotation of the open propulsor rotor. The turbine engine includes an engine core, an inlet section, an exhaust section and a flowpath. The engine core includes a compressor section, a combustor section and a turbine section. The inlet section includes a flowpath inlet. The exhaust section includes a flowpath exhaust and a mixer at the flowpath exhaust. The flowpath extends from the flowpath inlet, through the inlet section, the compressor section, the combustor section, the turbine section and the exhaust section, to the flowpath exhaust. The mixer is configured to mix combustion products exhausted from the flowpath through the flowpath exhaust with ambient air outside of the propulsion system.

14 Claims, 16 Drawing Sheets

(56)                  References Cited

U.S. PATENT DOCUMENTS

|  |  |  |  |  |
|---|---|---|---|---|
| 12,012,892 | B1 | 6/2024 | Alahyari | |
| 2003/0182925 | A1 | 10/2003 | Lair | |
| 2005/0060983 | A1* | 3/2005 | Lardellier | F02K 3/06 |
| | | | | 60/262 |
| 2011/0056208 | A1* | 3/2011 | Norris | F02C 7/36 |
| | | | | 60/792 |
| 2012/0315141 | A1* | 12/2012 | Udall | F02K 1/48 |
| | | | | 416/94 |
| 2013/0098066 | A1 | 4/2013 | Gallet | |
| 2013/0315701 | A1* | 11/2013 | Neuteboom | F01D 9/041 |
| | | | | 415/209.1 |
| 2015/0284070 | A1 | 10/2015 | Breeze-Stringfellow | |
| 2016/0215727 | A1* | 7/2016 | Langridge | F02K 1/386 |
| 2021/0108573 | A1 | 4/2021 | Sibbach | |
| 2021/0355868 | A1 | 11/2021 | Yerram | |
| 2022/0195960 | A1* | 6/2022 | Schrell | F02K 3/06 |
| 2023/0167783 | A1* | 6/2023 | Bowden | F02K 1/46 |
| | | | | 60/770 |
| 2024/0060452 | A1* | 2/2024 | Kumar | F02C 7/32 |
| 2024/0208664 | A1 | 6/2024 | Menheere | |
| 2025/0237182 | A1 | 7/2025 | Gea Aguilera | |

OTHER PUBLICATIONS

Anonymous: "Exhaust mixer—Wikipedia", Mar. 18, 2024 (Mar. 18, 2024), pp. 1-3, XP093342533, Retrieved from the Internet: URL:https://en.wikipedia.org/w/index.php?title=Exhaust_mixer&oldid=1214320702.

EP Search Report for EP Patent Application No. 25206176.7 dated Feb. 27, 2026.

EP Search Report for EP Patent Application No. 25206173.4 dated Feb. 27, 2026.

* cited by examiner

OPEN ROTOR PROPULSION SYSTEM WITH EXHAUST MIXER(S)

BACKGROUND OF THE DISCLOSURE

1. Technical Field

This disclosure relates generally to an aircraft propulsion system and, more particularly, to an open rotor aircraft propulsion system.

2. Background Information

Various types and configurations of aircraft propulsion systems are known in the art including those with an open propulsor rotor. While these known aircraft propulsion systems have various benefits, there is still room in the art for improvement.

SUMMARY OF THE DISCLOSURE

According to an aspect of the present disclosure, a propulsion system is provided for an aircraft. This propulsion system includes a propulsion section and a turbine engine. The propulsion section includes an open propulsor rotor and an open guide vane structure disposed next to the open propulsor rotor. The turbine engine is configured to drive rotation of the open propulsor rotor about an axis. The turbine engine includes an engine core, an inlet section, an exhaust section and a flowpath. The engine core includes a compressor section, a combustor section and a turbine section. The inlet section includes a flowpath inlet. The exhaust section includes a flowpath exhaust and a mixer at the flowpath exhaust. The flowpath extends from the flowpath inlet, through the inlet section, the compressor section, the combustor section, the turbine section and the exhaust section, to the flowpath exhaust. The mixer is configured to mix combustion products exhausted from the flowpath through the flowpath exhaust with ambient air outside of the propulsion system.

According to another aspect of the present disclosure, another propulsion system is provided for an aircraft. This propulsion system includes a propulsion section and a turbine engine. The propulsion section includes an open propulsor rotor. The turbine engine is configured to drive rotation of the open propulsor rotor about an axis. The turbine engine includes an engine core, an inlet section, an exhaust section and a flowpath. The engine core includes a compressor section, a combustor section and a turbine section with the turbine section located between the compressor section and the open propulsor rotor along the axis. The inlet section includes a flowpath inlet. The exhaust section includes a flowpath exhaust and a mixer. The mixer at least partially forms the flowpath exhaust and includes a plurality of mixer projections arranged circumferentially along the flowpath exhaust. The flowpath extends from the flowpath inlet, through the inlet section, the compressor section, the combustor section, the turbine section and the exhaust section, to the flowpath exhaust.

According to still another aspect of the present disclosure, another propulsion system is provided for an aircraft. This propulsion system includes a propulsion section, a compressor section, a combustor section, a first turbine section, a second turbine section, an exhaust section and a flowpath. The propulsion section includes a propulsor rotor. The second turbine section is configured to drive rotation of the propulsor rotor about an axis. The exhaust section includes a plurality of exhaust outlets and a plurality of mixers. The exhaust outlets are arranged circumferentially about the axis. Each of the mixers is located at a respective one of the exhaust outlets to mix combustion products exhausted through the respective one of the exhaust outlets with another flow of air. The flowpath extends from a flowpath inlet, through the compressor section, the combustor section, the first turbine section, the second turbine section and the exhaust section, to the exhaust outlets.

The propulsor rotor may be configured as or otherwise include an open propulsor rotor.

The propulsion section may also include a guide vane structure axially next to and downstream of the propulsor rotor.

The mixer may be configured as or otherwise include a chevron mixer.

The mixer may be configured as or otherwise include a serrated edge mixer.

The flowpath exhaust may include an exhaust outlet. The mixer may form an outer peripheral boundary of the exhaust outlet.

The flowpath exhaust may include an exhaust outlet. The mixer may form an inner peripheral boundary of the exhaust outlet.

The flowpath exhaust may include an exhaust outlet. The mixer may include a plurality of mixer projections arranged circumferentially about the exhaust outlet.

The mixer projections may be configured as or otherwise include a plurality of chevrons.

The mixer projections may be symmetrically arranged circumferentially about the exhaust outlet.

The exhaust outlet may be non-annular.

The exhaust outlet may be annular and the mixer projections may be arranged circumferentially along an outer side of the exhaust outlet.

The mixer may also include a plurality of inner mixer projections arranged circumferentially along an inner side of the exhaust outlet.

The flowpath exhaust may be formed collectively by a plurality of exhaust outlets. The mixer may be one of a plurality of mixers. Each of the mixers may be configured with a respective one of the exhaust outlets.

The flowpath exhaust may be disposed axially between the open propulsor rotor and the open guide vane structure.

The flowpath exhaust may be axially aligned with the open guide vane structure.

The open guide vane structure may be disposed axially between the open propulsor rotor and the flowpath exhaust.

The turbine section may be disposed axially between the compressor section and the open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
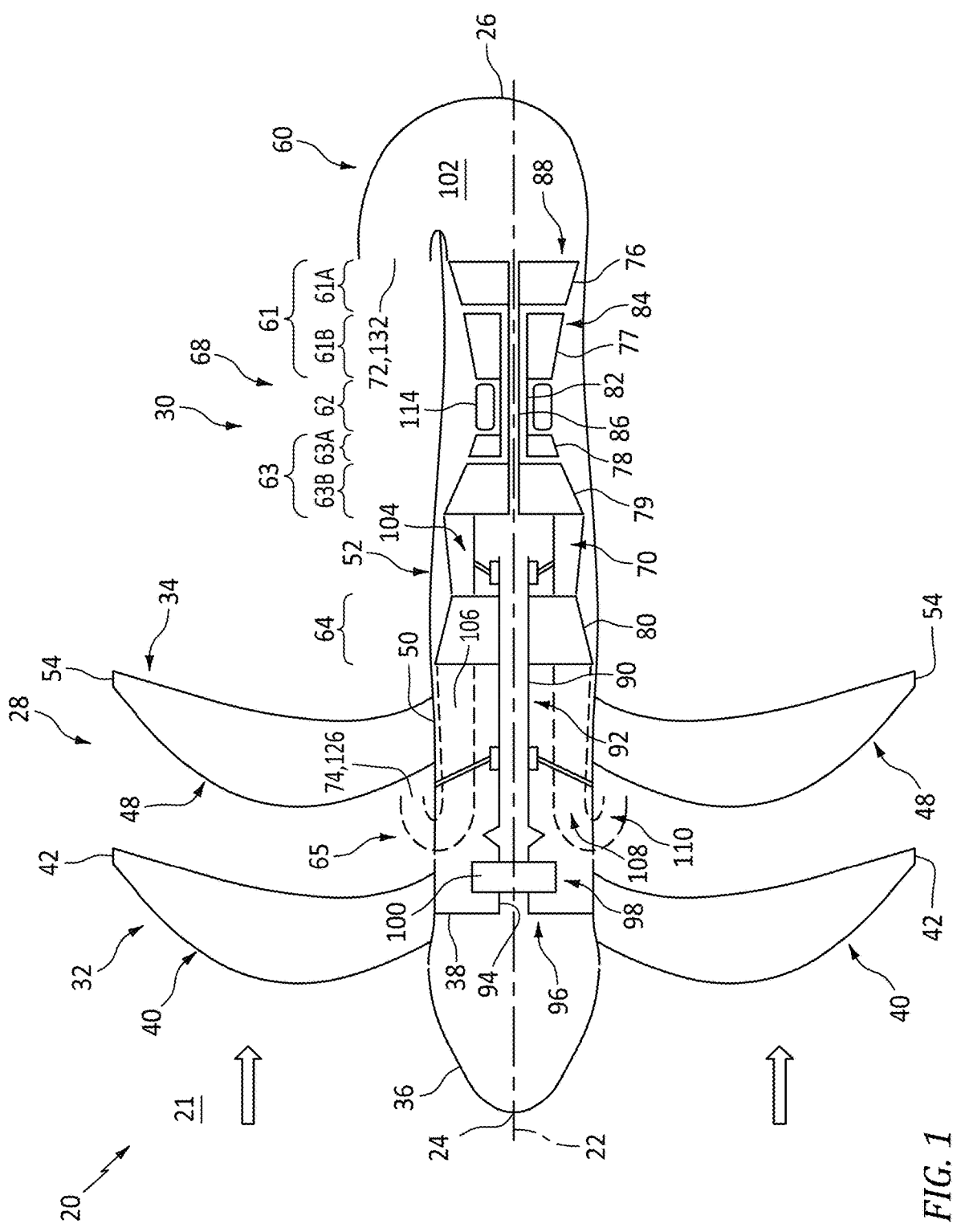
FIG. 1 is a side schematic illustration of an aircraft propulsion system.

FIG. 1 is a side schematic illustration of a propulsion system 20 for an aircraft. The aircraft may be an airplane, a drone (e.g., an unmanned aerial vehicle (UAV)) or any other manned or unmanned aerial vehicle or system. The aircraft propulsion system 20 of FIG. 1 is configured as an open rotor propulsion system; e.g., a single rotor and swirl recovery vane (SRV) open rotor propulsion system. Here, the term "open" may describe a propulsion system section and/or a propulsion system component which is open to an environment 21 (e.g., an ambient environment) external to the aircraft propulsion system 20 and, more generally, the aircraft.

The aircraft propulsion system 20 extends axially along an axis 22 between an upstream, forward end 24 of the aircraft propulsion system 20 and a downstream, aft end 26 of the aircraft propulsion system 20. The propulsion system axis 22 may be a centerline axis of the aircraft propulsion system 20 and/or a centerline axis of one or more members of the aircraft propulsion system 20. The propulsion system axis 22 may also or alternatively be a rotational axis of one or more members of the aircraft propulsion system 20. The aircraft propulsion system 20 of FIG. 1 includes an open rotor propulsion section 28 (e.g., a single rotor and swirl recovery vane (SRV) propulsion module) and a turbine engine 30 (e.g., a reverse flow gas turbine engine) configured to power operation of the propulsion section 28.

The propulsion section 28 of FIG. 1 includes an open propulsor rotor 32 and an open guide vane structure 34. These propulsion section members 32 and 34 are un-ducted and unshrouded components of the aircraft propulsion system 20 and its propulsion section 28. The propulsion section 28 of FIG. 1 also includes a nose cone 36 disposed at (e.g., on, adjacent or proximate) the propulsion system forward end 24. Briefly, this nose cone 36 may be configured as a spinner which is rotatable with the propulsor rotor 32 about the propulsion system axis 22. Alternatively, the nose cone 36 may be configured as a stationary structure of the propulsion section 28.

Figure 2:
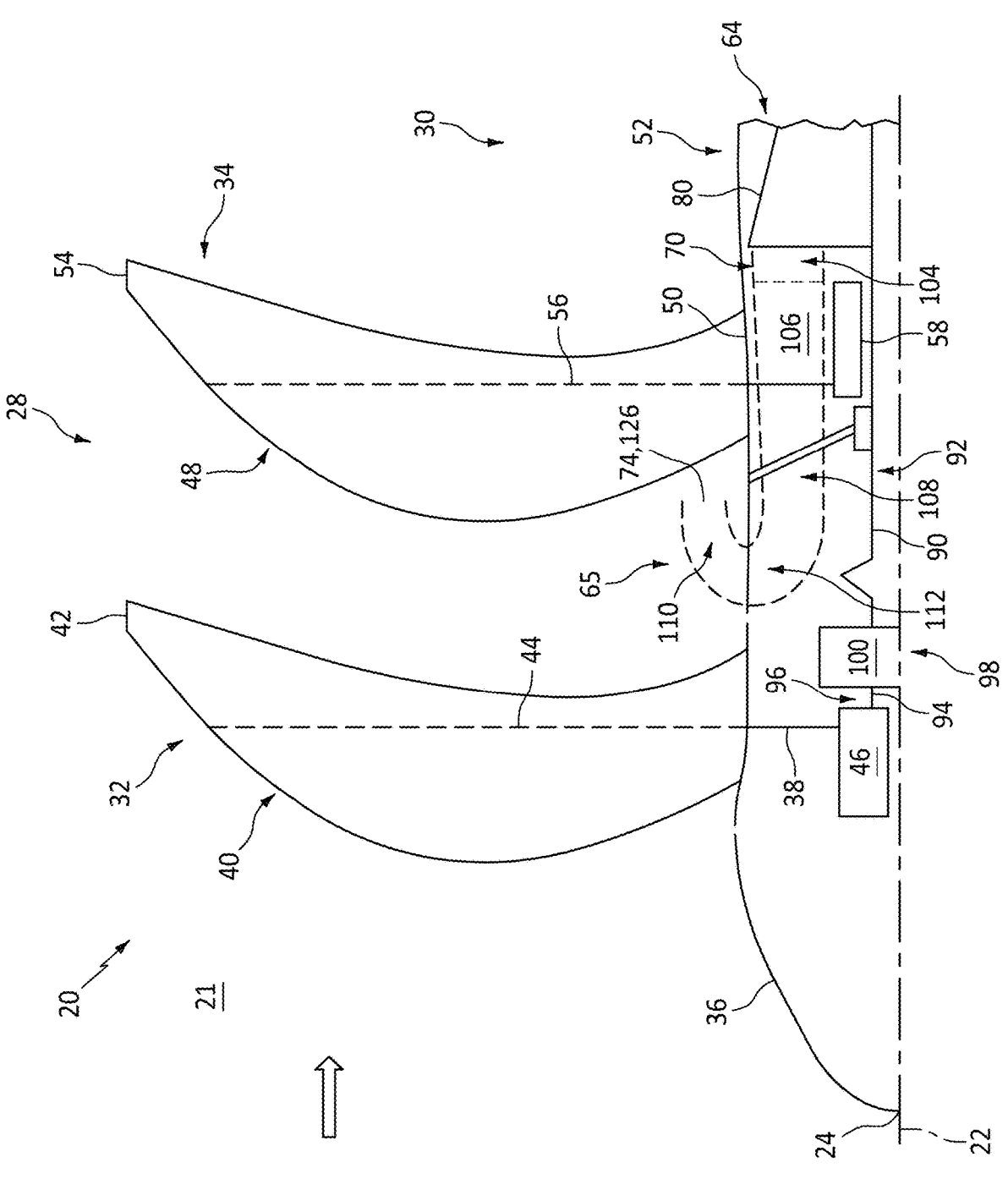
FIG. 2 is a partial side schematic illustration of the aircraft propulsion system at a propulsion section.

Referring to FIG. 2, the propulsor rotor 32 includes a propulsor rotor base 38 (e.g., a disk or a hub) and a plurality of open propulsor blades 40 (e.g., airfoils). The propulsor blades 40 are arranged and may be equispaced circumferentially about the rotor base 38 and the propulsion system axis 22 in an array; e.g., a circular array. Each of the propulsor blades 40 is connected to (e.g., formed integral with or otherwise attached to) the rotor base 38. Each of the propulsor blades 40 projects spanwise along a span line of the respective propulsor blade 40 (e.g., radially relative to the propulsion system axis 22) out from an exterior surface of the rotor base 38, into the external environment 21, to an unshrouded distal tip 42 of the respective propulsor blade 40. Each propulsor blade 40 is thereby configured as an un-ducted and unshrouded propulsor blade which is exposed to (e.g., disposed in) the surrounding external environment 21.

Each propulsor blade 40 may be configured to pivot about a respective pivot axis 44. This blade pivot axis 44 extends radially relative to the propulsion system axis 22. The blade pivot axis 44 of FIG. 2, for example, is arranged perpendicular to the propulsion system axis 22 when viewed, for example, in a longitudinal reference plane parallel to (e.g., including) the propulsion system axis 22; e.g., the plane of FIG. 2. Each propulsor blade 40 of FIG. 2 is operatively coupled with a blade actuation system 46 (schematically shown). This blade actuation system 46 is configured to pivot each propulsor blade 40 about its respective blade pivot axis 44. By pivoting each propulsor blade 40 about its blade pivot axis 44, a pitch of the respective propulsor blade 40 may be changed. Note, while the blade pivot axis 44 is shown in FIG. 2 as being perpendicular to the propulsion system axis 22, it is contemplated this blade pivot axis 44 may or may not be coincident with the propulsion system axis 22. Moreover, it is contemplated each blade pivot axis 44 may alternatively be angularly offset from the propulsion system axis 22 by an acute angle or an obtuse angle when viewed, for example, in the longitudinal reference plane. Of course, it is contemplated some or all of the propulsor blades 40 may be alternatively moved to change the propulsor blade 40 pitch. Moreover, it is contemplated some or all of the propulsor blades 40 may alternatively be fixed pitch propulsor blades.

The guide vane structure 34 of FIG. 2 includes a plurality of open exit guide vanes 48; e.g., airfoils. The guide vanes 48 are arranged and may be equispaced circumferentially about the propulsion system axis 22 in an array; e.g., a circular array. The guide vane structure 34 and its guide vanes 48 are arranged axially next to (e.g., adjacent) the propulsor rotor 32 and its propulsor blades 40. The guide vane structure 34 and its guide vanes 48 of FIG. 2, for example, are arranged downstream of the propulsor rotor 32 and its propulsor blades 40, without (e.g., any) other propulsor rotors or guide vane structures axially therebetween to propel and/or turn the air propelled by the propulsor rotor 32 to the guide vane structure 34 for example. Each of the guide vanes 48 of FIG. 2 is coupled to a support structure 50 of a housing 52 for the aircraft propulsion system 20; e.g., a case and a nacelle. This support structure 50 may be a support frame, a case or another fixed structure of the propulsion system housing 52. Each of the guide vanes 48 projects spanwise along a span line of the respective guide vane 48 (e.g., radially relative to the propulsion system axis 22) out from an exterior surface of the propulsion system housing 52, into the external environment 21, to an unshrouded distal tip 54 of the respective guide vane 48. Each guide vane 48 is thereby configured as an un-ducted and unshrouded guide vane which is exposed to (e.g., disposed in) the surrounding external environment 21.

Each guide vane 48 may be configured to pivot about a respective pivot axis 56. This vane pivot axis 56 extends radially relative to the propulsion system axis 22. The vane pivot axis 56 of FIG. 2, for example, is arranged perpendicular to the propulsion system axis 22 when viewed, for example, in the longitudinal reference plane. Each guide vane 48 of FIG. 2 is operatively coupled with a vane actuation system 58 (schematically shown), which vane actuation system 58 may be discrete from or integrated as part of the blade actuation system 46. The vane actuation system 58 is configured to pivot each guide vane 48 about its vane pivot axis 56. By pivoting each guide vane 48 about its vane pivot axis 56, a pitch of the respective guide vane 48 may be changed. Note, while the vane pivot axis 56 is shown in FIG. 2 as being perpendicular to the propulsion system axis 22, it is contemplated this vane pivot axis 56 may or may not be coincident with the propulsion system axis 22. Moreover, it is contemplated each vane pivot axis 56 may alternatively be angularly offset from the propulsion system axis 22 by an acute angle or an obtuse angle when viewed, for example, in the longitudinal reference plane. Of course, it is contemplated some or all of the guide vanes 48 may be alternatively moved to change the guide vane 48 pitch. Moreover, it is contemplated some or all of the guide vanes 48 may alternatively be configured as fixed pitch guide vanes.

Referring to FIG. 1, the turbine engine 30 includes an inlet section 60, a core compressor section 61, a core combustor section 62, a core turbine section 63, a power turbine (PT) section 64 and an exhaust section 65. Here, at least (or only) the core compressor section 61, the core combustor section 62 and the core turbine section 63 collectively form a core 68 of the turbine engine 30; e.g., a gas generator. The core compressor section 61 of FIG. 1 includes a low pressure compressor (LPC) section 61A and a high pressure compressor (HPC) section 61B. The core turbine section 63 of FIG. 1 includes a high pressure turbine (HPT) section 63A and an intermediate pressure turbine (IPT) section 63B, where the PT section 64 is a low pressure turbine (LPT) section of the turbine engine 30. The turbine engine 30 also includes an engine flowpath 70 which extends longitudinally through the aircraft propulsion system 20 and its turbine engine 30 from an airflow inlet 72 into the engine flowpath 70 to a combustion products exhaust 74 from the engine flowpath 70. Here, the flowpath inlet 72 is also an airflow inlet into the aircraft propulsion system 20 and its turbine engine 30. The flowpath exhaust 74 is also a combustion products exhaust from the aircraft propulsion system 20 and its turbine engine 30.

The LPC section 61A, the HPC section 61B, the core combustor section 62, the HPT section 63A, the IPT section 63B, the PT section 64 and the propulsion section 28 may be arranged sequentially along the propulsion system axis 22 between the propulsion system aft end 26 and the propulsion system forward end 24. The inlet section 60 of FIG. 1 is disposed at the propulsion system aft end 26. The exhaust section 65 of FIG. 1 is disposed near the propulsion system forward end 24, for example axially between (a) the PT section 64 and/or the engine core 68 and (b) the propulsor rotor 32. With this reverse flow arrangement, the HPT section 63A, the IPT section 63B, the PT section 64 and the exhaust section 65 may be arranged axially along the propulsion system axis 22 between (a) one or more of the engine sections 61A, 61B, 62 and (b) the propulsor rotor 32. The HPT section 63A, the IPT section 63B and optionally the PT section 64 may be arranged axially along the propulsion system axis 22 between (a) the core combustor section 62 and (b) the propulsion section 28 and its propulsion section members 32 and 34. The PT section 64 may be arranged axially along the propulsion system axis 22 between (a) the engine core 68 and (b) the propulsor rotor 32 and, more generally, the entire propulsion section 28. The engine core 68 and the PT section 64 may each be arranged axially along the propulsion system axis 22 between (a) the inlet section 60 and/or the propulsion system aft end 26 and (b) the propulsor rotor 32 and, more generally, the entire propulsion section 28. The LPC section 61A, the HPC section 61B, the core combustor section 62, the HPT section 63A, the IPT section 63B and the PT section 64 are arranged within the propulsion system housing 52. Here, the propulsor rotor 32 and the guide vane structure 34 are arranged outside of the propulsion system housing 52.

Each of the engine sections 61A, 61B, 63A, 63B and 64 includes a respective bladed rotor 76-80; e.g., a ducted and/or shrouded engine rotor. Each of these engine rotors 76-80 includes a rotor base (e.g., a disk or a hub) and a plurality of rotor blades (e.g., airfoils, vanes, etc.). The rotor blades are arranged and may be equispaced circumferentially around the respective rotor base and the propulsion system axis 22 in an array. The rotor blades may also be arranged into one or more stages longitudinally along the engine flowpath 70. Each of the rotor blades is connected to the respective rotor base. Each of the rotor blades projects radially (e.g., spanwise) out from the respective rotor base into the engine flowpath 70 and to a distal tip of the respective rotor blade.

The HPC rotor 77 is coupled to and rotatable with the HPT rotor 78. The HPC rotor 77 of FIG. 1, for example, is connected to the HPT rotor 78 by a high speed shaft 82. At least (or only) the HPC rotor 77, the HPT rotor 78 and the high speed shaft 82 collectively form a high speed rotating assembly 84; e.g., a high speed spool of the turbine engine 30 and its engine core 68. This high speed rotating assembly 84 of FIG. 1 and its members 77, 78 and 82 are rotatable about the propulsion system axis 22. However, in other embodiments, the high speed rotating assembly 84 and its members 77, 78 and 82 may alternatively be rotatable about another rotational axis which is (e.g., laterally and/or angularly) offset from an axis of the propulsor rotor 32.

The LPC rotor 76 is coupled to and rotatable with the IPT rotor 79. The LPC rotor 76 of FIG. 1, for example, is connected to the IPT rotor 79 by a low speed shaft 86. At least (or only) the LPC rotor 76, the IPT rotor 79 and the low speed shaft 86 collectively form a low speed rotating assembly 88; e.g., a low speed spool of the turbine engine 30 and its engine core 68. This low speed rotating assembly 88 of FIG. 1 and its members 76, 79 and 86 are rotatable about the propulsion system axis 22. However, in other embodiments, the low speed rotating assembly 88 and its members 76, 79 and 86 may alternatively be rotatable about another rotational axis which is (e.g., laterally and/or angularly) offset from an axis of the propulsor rotor 32.

The PT rotor 80 (e.g., the LPT rotor) is connected to and rotatable with a power turbine shaft 90. At least (or only) the PT rotor 80 and the power turbine shaft 90 collectively form a power turbine rotating assembly 92. This power turbine rotating assembly 92 of FIG. 1 and its members 80 and 90 are rotatable about the propulsion system axis 22. However, in other embodiments, the power turbine rotating assembly 92 and its members 80 and 90 may alternatively be rotatable about another rotational axis which is (e.g., laterally and/or angularly) offset from an axis of the propulsor rotor 32.

The propulsor rotor 32 is connected to and rotatable with a propulsor shaft 94. At least (or only) the propulsor rotor 32 and the propulsor shaft 94 collectively form a propulsor rotating assembly 96. This propulsor rotating assembly 96 of FIG. 1 and its members 32 and 94 are rotatable about the propulsion system axis 22. The propulsor rotating assembly 96 is coupled to the power turbine rotating assembly 92 through a drivetrain 98. The drivetrain 98 may be configured as a geared drivetrain, where a geartrain 100 (e.g., a transmission, a speed change device, an epicyclic geartrain, etc.) is disposed between and operatively couples the propulsor rotating assembly 96 and its propulsor shaft 94 to the power turbine rotating assembly 92 and its power turbine shaft 90. With this arrangement, the propulsor rotor 32 may rotate at a different (e.g., slower) rotational speed than the power turbine rotating assembly 92 and its PT rotor 80. However, the drivetrain 98 may alternatively be configured as a direct drive drivetrain, where the geartrain 100 is omitted. With this arrangement, the propulsor rotor 32 and the PT rotor 80 may rotate at a common (the same) rotational speed.

The engine flowpath 70 extends sequentially from the flowpath inlet 72, through the inlet section 60, the LPC section 61A, the HPC section 61B, the core combustor section 62, the HPT section 63A, the IPT section 63B, the PT section 64 and the exhaust section 65, to the flowpath exhaust 74. The engine flowpath 70 of FIG. 1 is collectively formed by at least (or only) an inlet flowpath 102, a core flowpath 104 and an exhaust flowpath 106.

The inlet flowpath 102 of FIG. 1 fluidly couples the external environment 21 to the core flowpath 104. The inlet flowpath 102 of FIG. 1, for example, extends longitudinally from the flowpath inlet 72 to an upstream end of the core flowpath 104. Between the flowpath inlet 72 and the engine core 68 and its LPC section 61A, the inlet flowpath 102 may axially reverse its direction. An upstream section of the inlet flowpath 102 of FIG. 1, for example, projects axially in an axial aft direction (e.g., left-to-right in FIG. 1) into the turbine engine 30 from the flowpath inlet 72. The inlet flowpath 102 then turns radially inwards and reverses its direction such that a downstream section of the inlet flowpath 102 extends axially in an axial forward direction (e.g., right-to-left in FIG. 1) to the engine core 68 and its LPC section 61A.

The flowpath inlet 72 is laterally offset from and may be radially outboard of the engine core 68 at or about the propulsion system aft end 26. The upstream section of the inlet flowpath 102 may thereby be located laterally next to (e.g., radially outboard of) and axially overlap (e.g., extend axially along) the downstream section of the inlet flowpath 102 and, optionally, at least an upstream portion of the core flowpath 104.

The core flowpath 104 fluidly couples the inlet flowpath 102 to the exhaust flowpath 106. This core flowpath 104 extends longitudinally, in the axial forward direction towards the propulsion section 28 and its propulsor rotor 32, through the engine core 68 and the PT section 64. The core flowpath 104 of FIG. 1, for example, extends from a downstream end of the inlet flowpath 102, sequentially through the LPC section 61A, the HPC section 61B, the core combustor section 62, the HPT section 63A, the IPT section 63B and the PT section 64, to an upstream end of the exhaust flowpath 106. The core flowpath 104 of FIG. 1 is annular within the engine sections 61A-64.

The exhaust flowpath 106 fluidly couples the core flowpath 104 to the external environment 21. The exhaust flowpath 106 of FIG. 2, for example, extends longitudinally from a downstream end of the core flowpath 104 to the flowpath exhaust 74. Between the flowpath exhaust 74 and the PT section 64, the exhaust flowpath 106 may axially reverse its direction. An upstream section 108 of the exhaust flowpath 106 of FIG. 2, for example, extends axially in the axial forward direction away from the PT section 64. Here, the upstream section 108 of the exhaust flowpath 106 is radially inboard of and extends axially along the guide vane structure 34 and its guide vanes 48, and the guide vane structure 34 and its array of the guide vanes 48 circumscribe the upstream section 108 of the exhaust flowpath 106. The exhaust flowpath 106 then turns radially outwards and reverses its direction such that a downstream section 110 of the exhaust flowpath 106 extends axially in the axial aft direction to the flowpath exhaust 74. This turnout-reversal section 112 of the exhaust flowpath 106 which turns radially outward and/or reverses the direction of the exhaust flowpath 106 may be located axially along and/or forward and upstream (relative to flow outside of the aircraft propulsion system 20) of the guide vane structure 34. The turnout-reversal section 112 of FIG. 2, for example, is located axially between the propulsor rotor 32 and the guide vane structure 34. With such an arrangement, an overall axial length of the aircraft propulsion system 20 between its propulsion system forward end 24 and its propulsion system aft end 26 may be shortened, for example, compared to an arrangement where a turnout-reversal section of an exhaust flowpath is axially aft and downstream (relative to flow outside of an aircraft propulsion system) of a guide vane structure because the PT section 64 of FIG. 2 may be located closer to the propulsor rotor 32. By reducing the overall axial length of the aircraft propulsion system 20, an overall weight as well as aerodynamic drag along the aircraft propulsion system 20 may also be reduced.

The flowpath exhaust 74 is laterally offset from and may be radially outboard of the PT section 64 as well as the propulsion system housing 52 and its support structure 50. The downstream section 110 of the exhaust flowpath 106 may thereby be located laterally next to (e.g., radially outboard of) and axially overlap (e.g., extend axially along) the upstream section 108 of the exhaust flowpath 106 and, optionally, at least a downstream portion of the core flowpath 104.

During operation of the aircraft propulsion system 20 of FIG. 1, ambient air within the external environment 21 is propelled by the propulsor rotor 32 across the guide vane structure 34 in an aft, downstream direction towards the propulsion system aft end 26. The guide vane structure 34 and its guide vanes 48 condition (e.g., straighten out) the air propelled by the propulsor rotor 32, for example, to remove or reduce circumferential swirl. A major outer portion of the air propelled by the propulsor rotor 32 across the guide vane structure 34 provides forward thrust. A minor inner portion of the air propelled by the propulsor rotor 32 across the guide vane structure 34 is directed into the turbine engine 30 and its engine flowpath 70 through its flowpath inlet 72. The air entering the core flowpath 104 may be referred to as "core air".

The core air is compressed by the LPC rotor 76 and the HPC rotor 77 and directed into a combustion chamber 114 (e.g., an annular combustion chamber) of a combustor (e.g., an annular combustor) in the core combustor section 62. Fuel is injected into the combustion chamber 114 and mixed with the compressed core air to provide a fuel-air mixture. This fuel-air mixture is ignited and combustion products thereof flow through and sequentially drive rotation of the HPT rotor 78, the IPT rotor 79 and the PT rotor 80 before being exhausted out of the turbine engine 30 though the flowpath exhaust 74 into the external environment 21. The rotation of the HPT rotor 78 and the IPT rotor 79 respectively drive rotation of the HPC rotor 77 and the LPC rotor 76 and, thus, compression of the core air received from the inlet flowpath 102. The rotation of the PT rotor 80 drives rotation of the propulsor rotor 32 through the drivetrain 98. The rotation of the propulsor rotor 32 propels the ambient air within the external environment 21 across the guide vane structure 34 in the aft, downstream direction. With this arrangement, the turbine engine 30 and its PT section 64 power operation of (e.g., drive rotation of) the propulsor rotor 32 during aircraft propulsion system operation.

Figure 3:
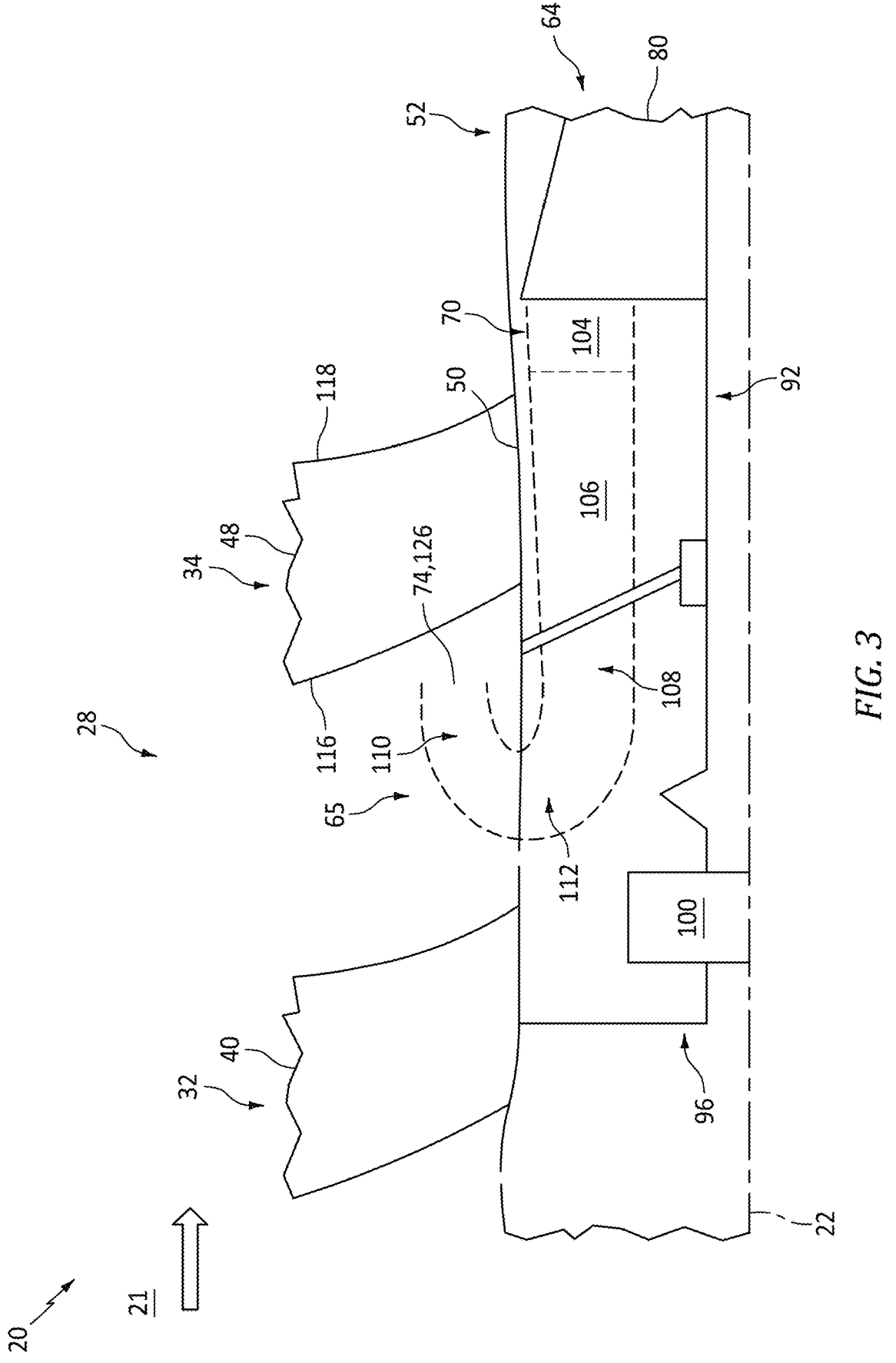
FIGS. 3-5 are partial side schematic illustrations of the aircraft propulsion system at the propulsion section with various exhaust section arrangements.

In some embodiments, referring to FIG. 3, the exhaust section 65 may be configured such that its flowpath exhaust 74 is axially forward and upstream of (relative to flow outside of the aircraft propulsion system 20) the guide vane structure 34 and its guide vanes 48. The flowpath exhaust 74 of FIG. 3, for example, is disposed at a location axially between (a) the propulsor rotor 32 and its propulsor blades 40 and (b) the guide vane structure 34 and its guide vanes 48, radially outboard of the propulsion system housing 52. With this arrangement, it is contemplated the exhaust section 65 may be configured to further condition the air propelled by the propulsor rotor 32 and thereby reduce aerodynamic loads on the guide vane structure 34 and its guide vanes 48.

Figure 4:
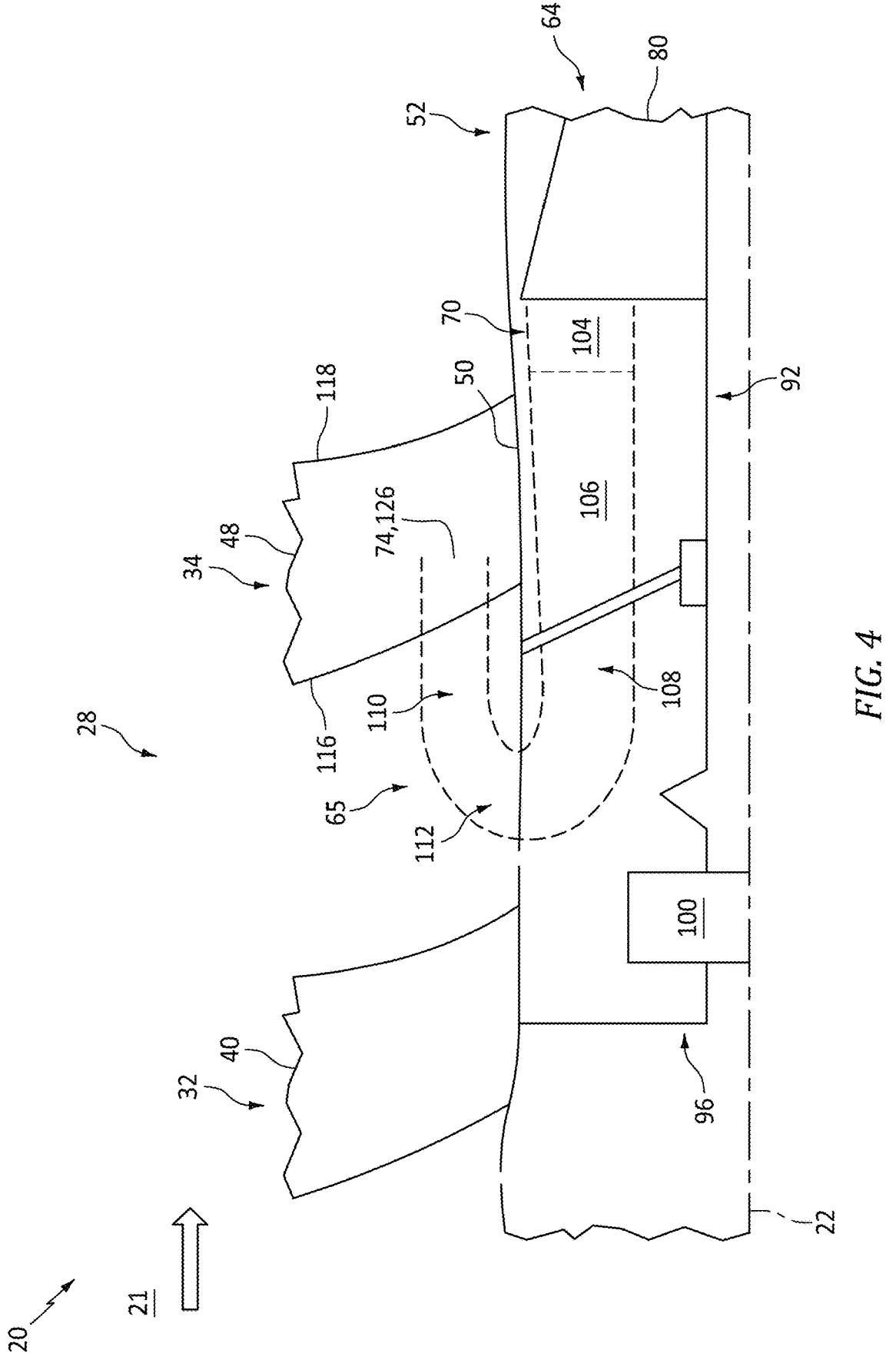

In some embodiments, referring to FIG. 4, the exhaust section 65 may be configured such that its flowpath exhaust 74 is axially aligned with the guide vane structure 34 and its guide vanes 48. The flowpath exhaust 74 of FIG. 4, for example, is disposed at a location axially along the guide vane structure 34 anywhere at or between a guide vane leading edge location 116 and a guide vane trailing edge location 118, radially outboard of the propulsion system housing 52.

Figure 5:
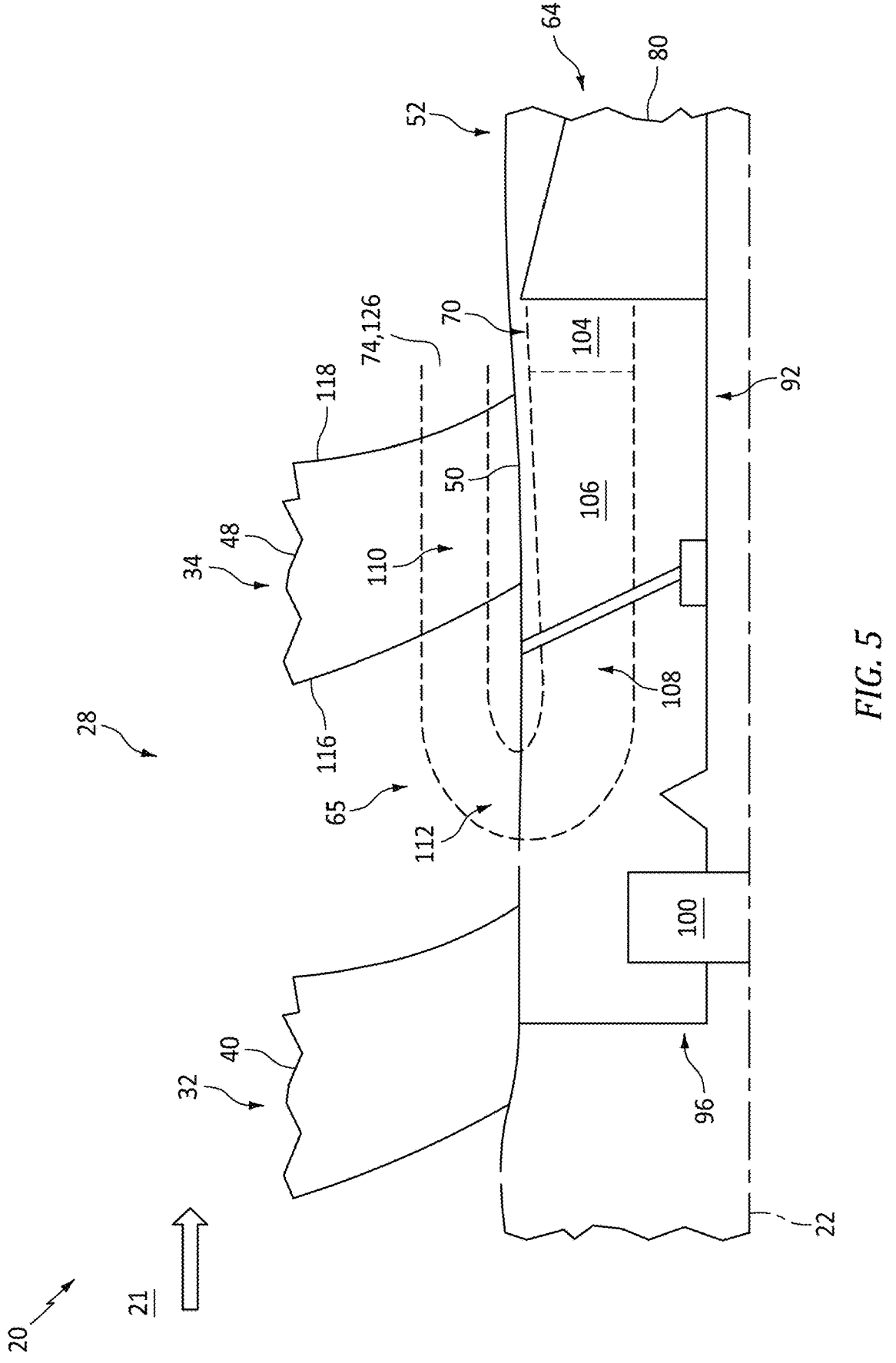

In some embodiments, referring to FIG. 5, the exhaust section 65 may be configured such that its flowpath exhaust 74 is axially aft and downstream of (relative to flow outside of the aircraft propulsion system 20) the guide vane structure 34 and its guide vanes 48. The flowpath exhaust 74 of FIG. 5, for example, is disposed at a location axially between the guide vane structure 34 and the PT section 64 (or optionally further aft along the turbine engine 30 of FIG. 1), radially outboard of the propulsion system housing 52. Here, the guide vane structure 34 is located axially between the propulsor rotor 32 and the flowpath exhaust 74. With this arrangement, by exhausting the combustion products downstream of the guide vane structure 34, the guide vanes 48 may be subject to lower temperatures than if the combustion products were exhausted axially upstream or along the guide vane structure 34.

Figure 6:
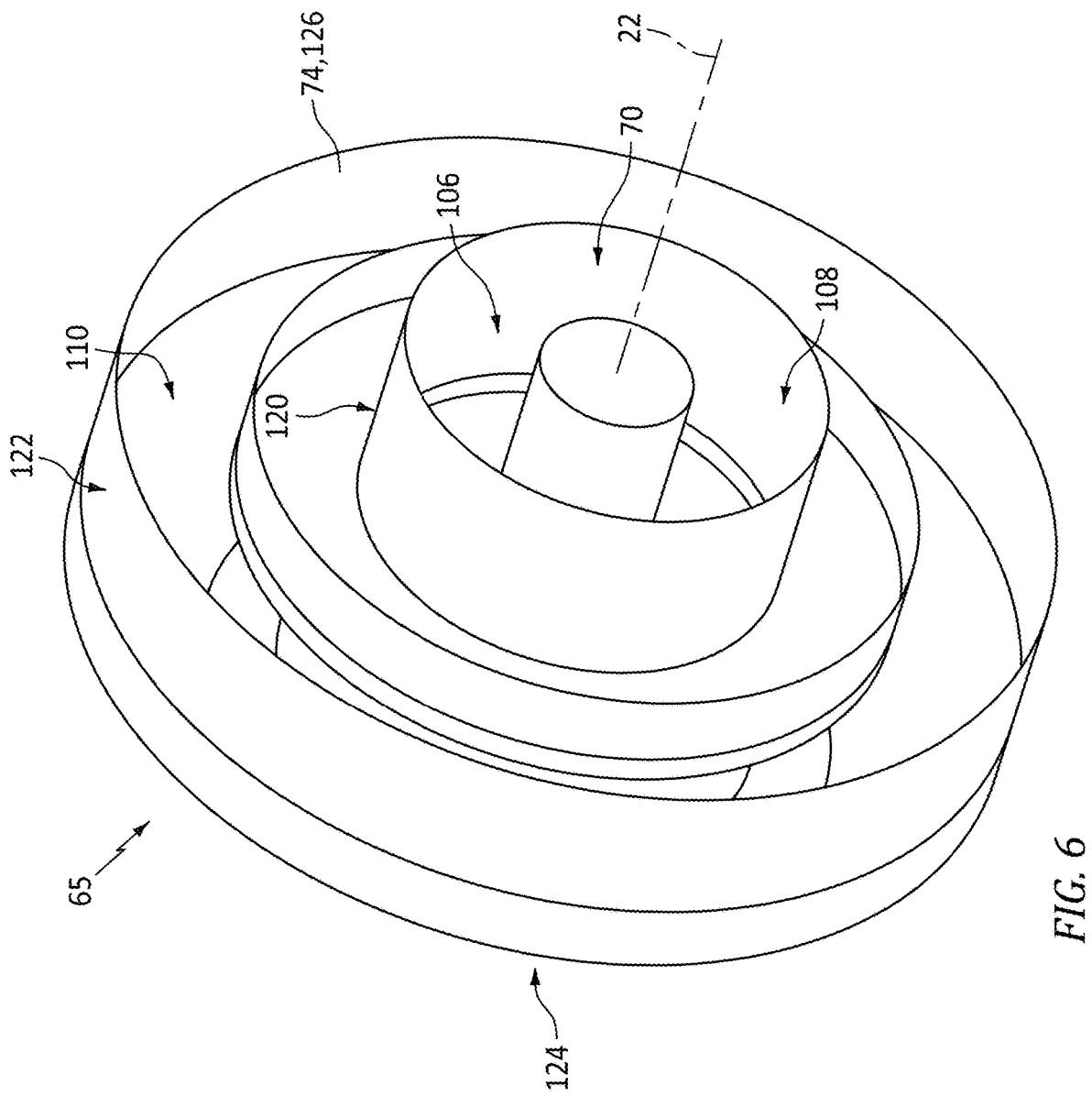
FIG. 6 is a perspective illustration of the exhaust section with an annular exhaust outlet.

In some embodiments, referring to FIG. 6, the exhaust flowpath 106 may be annular. The exhaust section 65 of FIG. 6, for example, includes an inner duct 120, an outer duct 122 and a transition duct 124 fluidly coupling the outer duct 122 to the inner duct 120. The inner duct 120 of FIG. 6 is annular and at least partially or completely forms the upstream section 108 of the exhaust flowpath 106. The outer duct 122 of FIG. 6 is annular and at least partially or completely forms the downstream section 110 of the exhaust flowpath 106. Here, the outer duct 122 is spaced radially outboard from the inner duct 120, and the outer duct 122 axially overlaps and circumscribes the inner duct 120. With the arrangement of FIG. 6, the flowpath exhaust 74 is formed by an annular exhaust outlet 126 configured at a downstream end of the outer duct 122.

Figure 7:
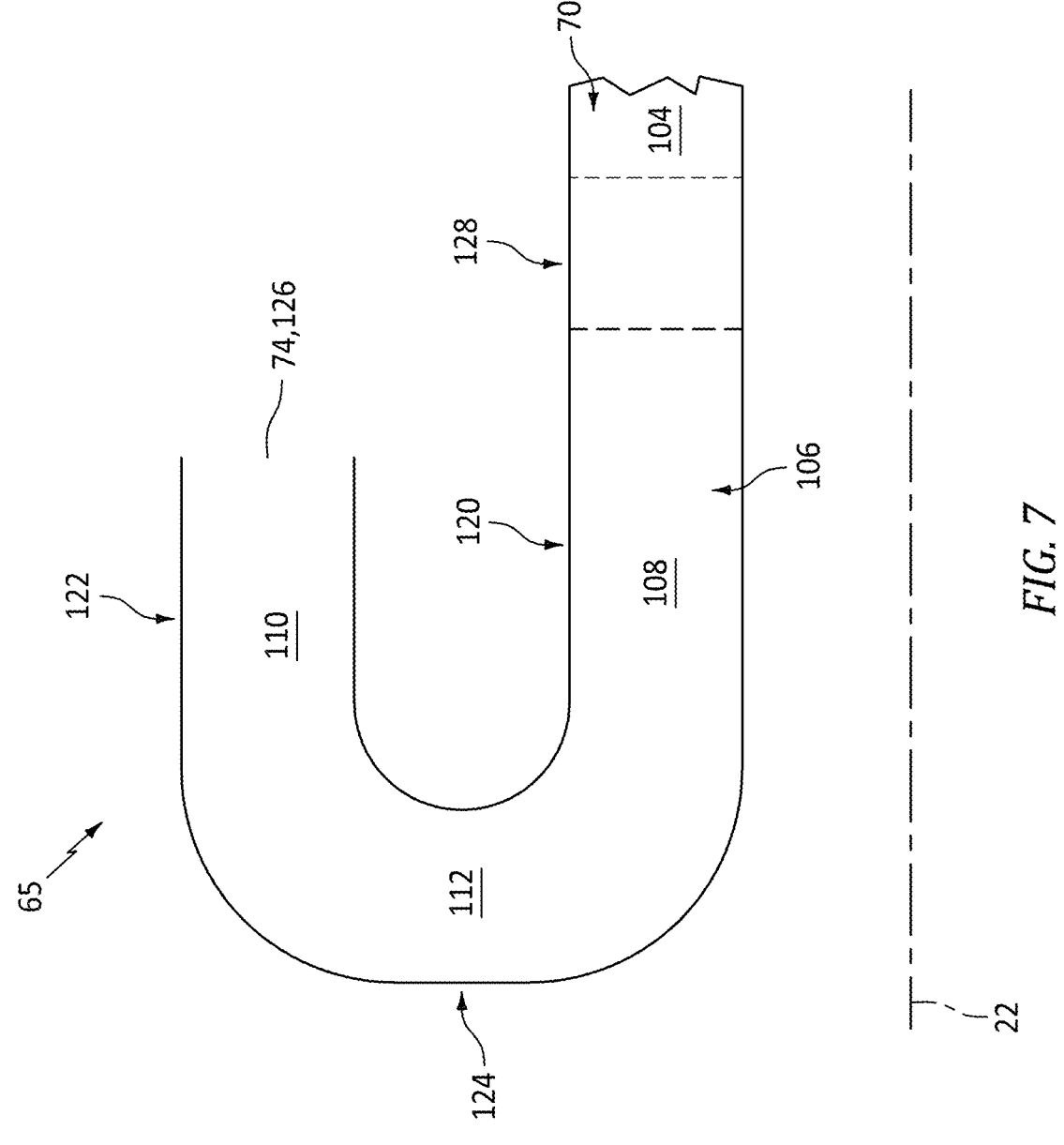
FIG. 7 is a partial side sectional illustration of the exhaust section with a non-annular exhaust outlet.
Figure 8:
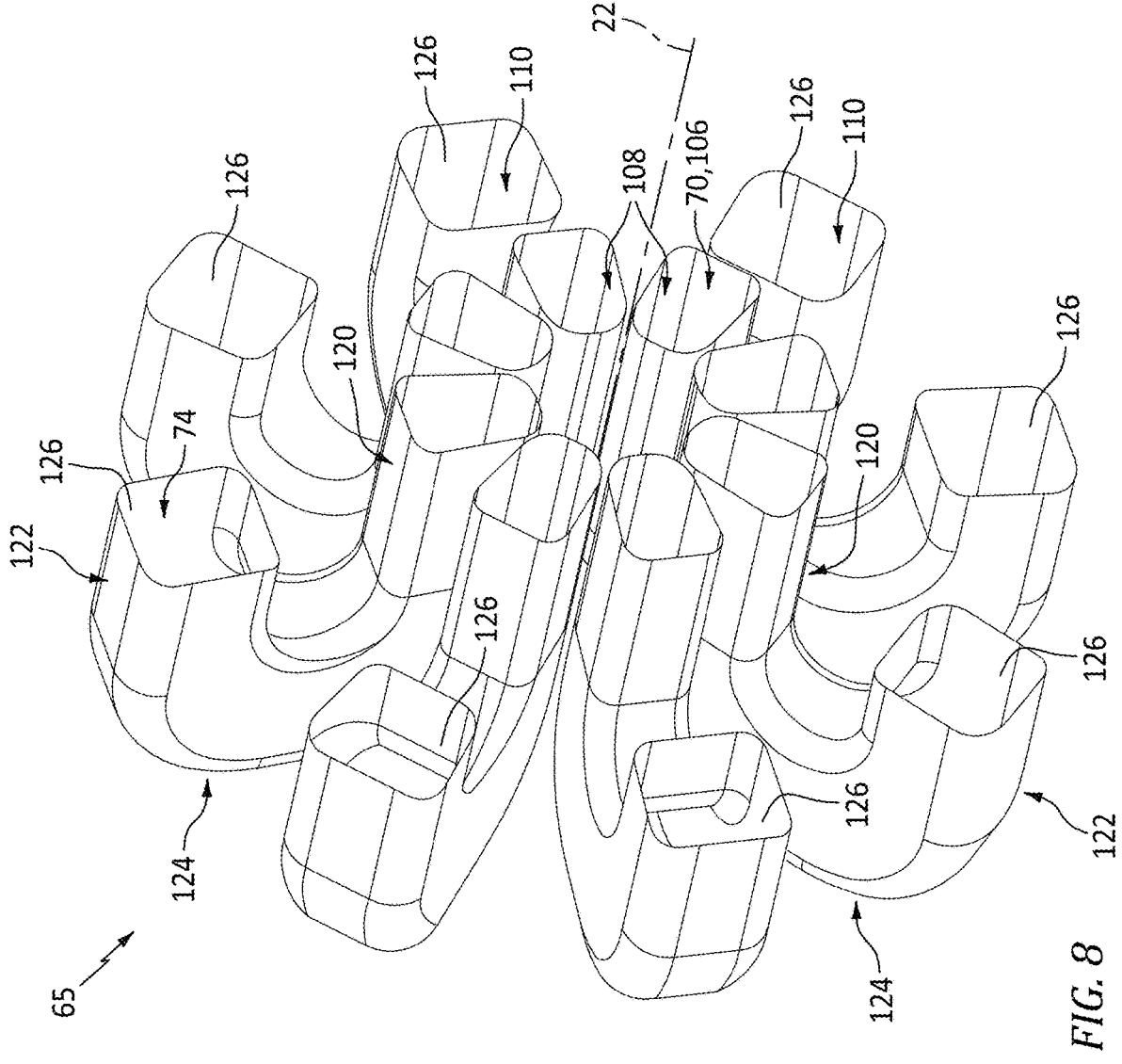
FIG. 8 is a perspective illustration of the exhaust section with multiple exhaust outlets.

In some embodiments, referring to FIGS. 7 and 8, at least a portion of the exhaust flowpath 106 may be circumferentially segmented. The exhaust section 65 of FIG. 7, for example, includes a manifold duct 128, one or more of the inner ducts 120, one or more of the outer ducts 122 and one or more of the transition ducts 124, where each transition duct 124 fluidly couples a respective one of the inner ducts 120 to a respective one of the outer ducts 122. The manifold duct 128 of FIG. 7 is annular and forms an upstream portion of the upstream section 108 of the exhaust flowpath 106. This manifold duct 128 is configured to fluidly couple the core flowpath 104 to each of the inner ducts 120 in parallel. Referring to FIG. 8, the inner ducts 120 are arranged and may (or may not) be equispaced circumferentially about the propulsion system axis 22 in an array; e.g., an annular array or alternatively an arcuate array. Referring to FIG. 7, each inner duct 120 projects axially out from the manifold duct 128 to a respective one of the transition ducts 124. Referring to FIG. 8, the outer ducts 122 are arranged and may (or may not) be equispaced circumferentially about the propulsion system axis 22 and the array of the inner ducts 120 in an array; e.g., an annular array or alternatively an arcuate array. Each outer duct 122 projects axially out from a respective one of the transition ducts 124 to a non-annular exhaust outlet 126. Here, each outer duct 122 is spaced radially outboard from a respective one of the inner ducts 120, and each outer duct 122 axially overlaps the respective inner duct 120. With the arrangement of FIG. 8, the flowpath exhaust 74 is formed by a plurality of the exhaust outlets 126, where each exhaust outlet 126 is configured at a downstream end of a respective one of the outer ducts 122.

In some embodiments, referring to FIG. 8, a center of each outer duct 122 may be circumferentially aligned with a center of the respective inner duct 120. In other embodiments, the center of each outer duct 122 may be circumferentially offset from the center of the respective inner duct 120. For example, each transition duct 124 may include a circumferential component to its centerline trajectory. Each outer duct 122 may also or alternatively include a circumferential component to its centerline trajectory. With such arrangements, the combustion products exhaust from the flowpath exhaust 74 may be swirled, for example, to counter air swirl imparted by the propulsor rotor 32 (see FIG. 1).

Figure 9:
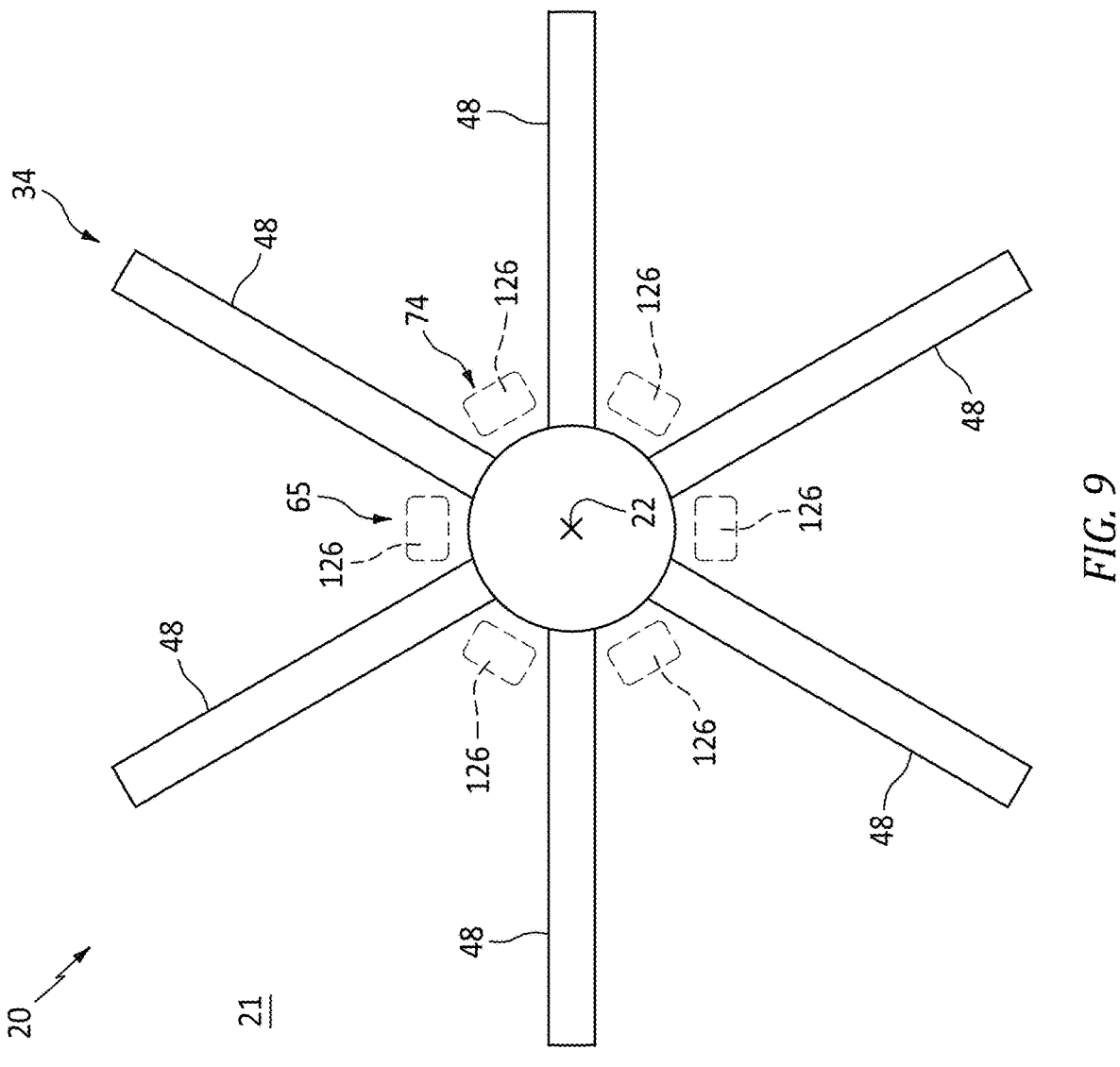
FIGS. 9-11 are schematic illustrations of various arrangements of the exhaust outlets with an open guide vane structure.
Figure 10:
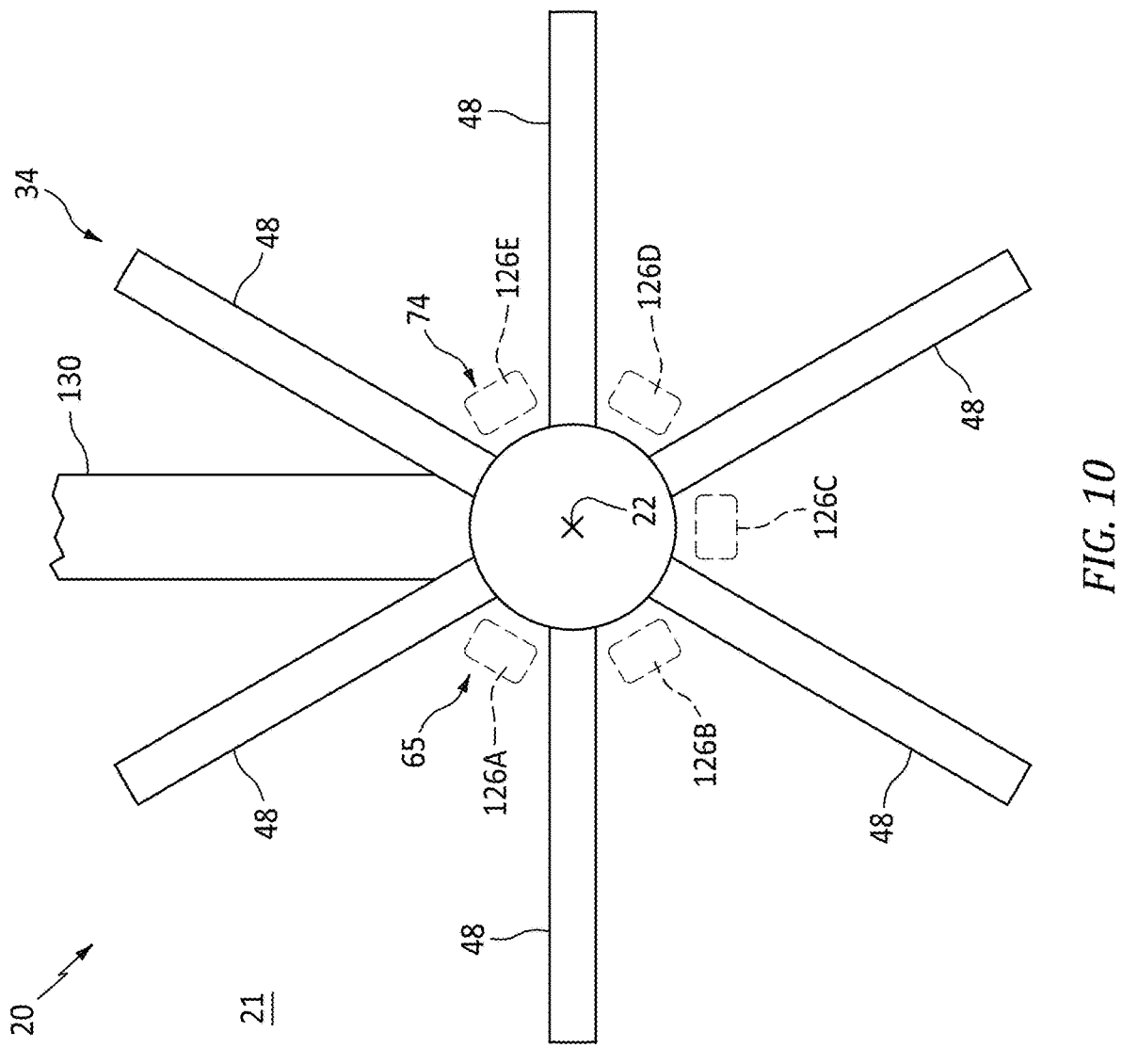
Figure 11:
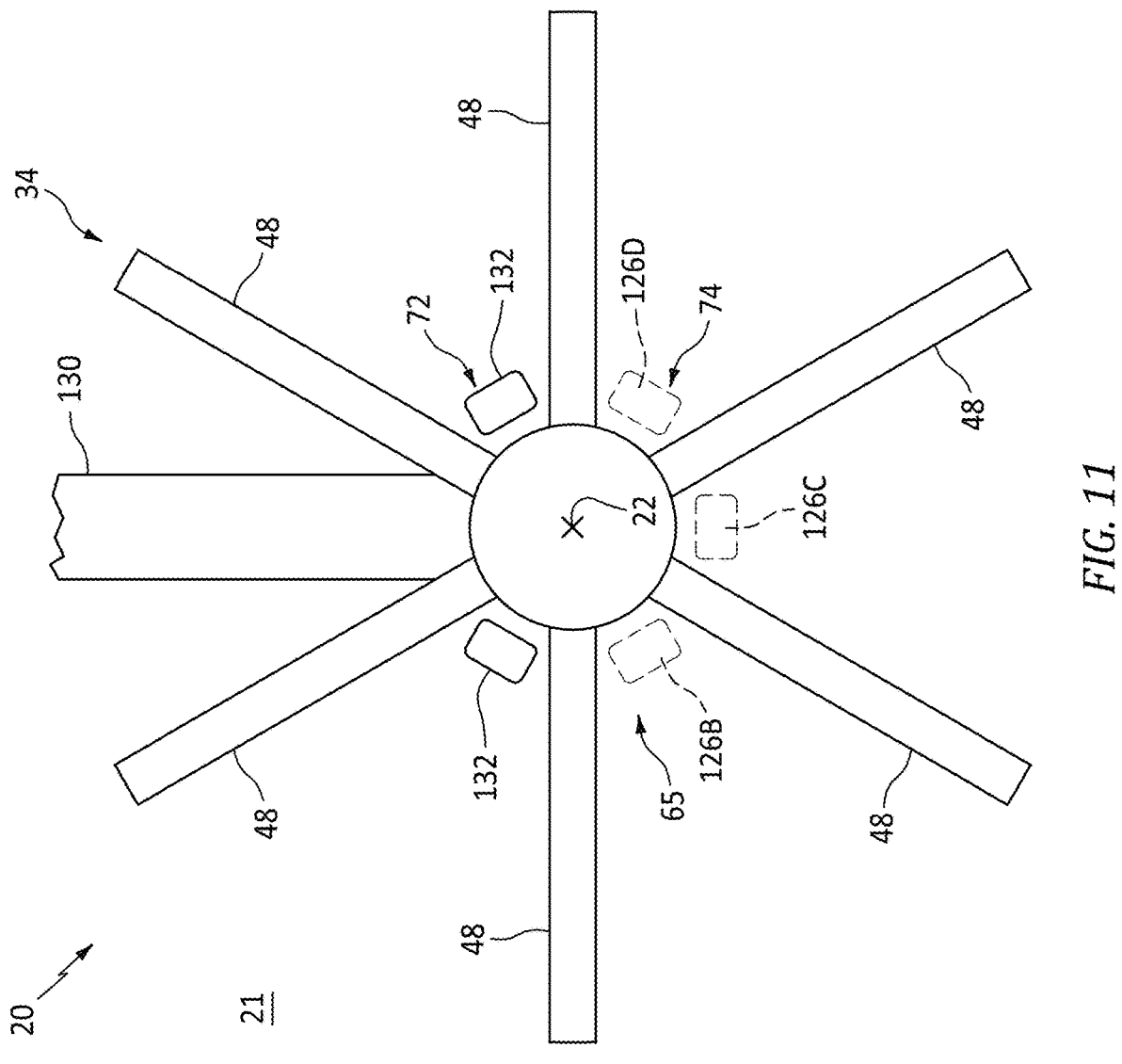

In some embodiments, referring to FIGS. 9-11, each exhaust outlet 126 may be aligned circumferentially between a respective circumferentially neighboring (e.g., adjacent) pair of the guide vanes 48. More particularly, each exhaust outlet 126 may circumferentially and radially overlap an inter-vane gap between the respective circumferentially neighboring guide vanes 48. Each exhaust outlet 126 of FIGS. 9-11 is also circumferentially spaced from one or both of the respective circumferentially neighboring guide vanes 48, for example to provide clearance to the respective circumferentially neighboring guide vanes 48 when pivoting and/or otherwise moving to change their pitch.

In some embodiments, referring to FIG. 9, the exhaust outlets 126 may be arranged in a symmetric array. Each circumferentially neighboring (e.g., adjacent) pair of the exhaust outlets 126 of FIG. 9, for example, are spaced about the propulsion system axis 22 by a uniform circumferential distance; e.g., an identical circumferential distance. With this arrangement, the exhaust outlets 126 are equispaced circumferentially around the propulsion system axis 22. In addition, a total number of the exhaust outlets 126 in FIG. 9 is equal to a total number of the guide vanes 48 and, thus, a total number of the inter-vane gaps.

In some embodiments, referring to FIGS. 10 and 11, the exhaust outlets 126A-E (generally referred to as "126") may be arranged in an asymmetric array. Each circumferentially neighboring pair of the exhaust outlets 126A and 126B, 126B and 126C, 126C and 126D, 126D and 126E of FIG. 10, for example, are spaced about the propulsion system axis 22 by a uniform circumferential distance; e.g., an identical circumferential distance. The circumferentially neighboring pair of the exhaust outlets 126A and 126E of FIG. 10, by contrast, are spaced about the propulsion system axis 22 by another circumferential distance that is different (e.g., greater) than the circumferential distance. With this arrangement, the exhaust outlets 126 of FIG. 10 are arranged about the propulsion system axis 22 such that, for example, each of the exhaust outlets 126 is circumferentially offset from (e.g., misaligned with) a downstream pylon structure 130 for mounting the aircraft propulsion system 20 to an airframe of the aircraft. Similarly, the exhaust outlets 126B-D of FIG. 11 are arranged about the propulsion system axis 22 such that, for example, each of the exhaust outlets 126 is circumferentially offset from (e.g., misaligned with) each downstream airflow inlet 132 forming the flowpath inlet 72. Note, while the flowpath inlet 72 is shown in FIG. 11 as being formed collectively by the multiple airflow inlets 132, it is contemplated the flowpath inlet 72 may alternatively be formed by a single (annular or non-annular) airflow inlet 132 in other embodiments. By circumferentially offsetting the flowpath exhaust 74 and its exhaust outlets 126 from the flowpath inlet 72 and its airflow inlets 132, the flowpath inlet 72 and its airflow inlets 132 may receive (e.g., fresh) ambient air with little or none of the combustion products exhausted from the flowpath exhaust 74 and its exhaust outlets 126.

Figure 12:
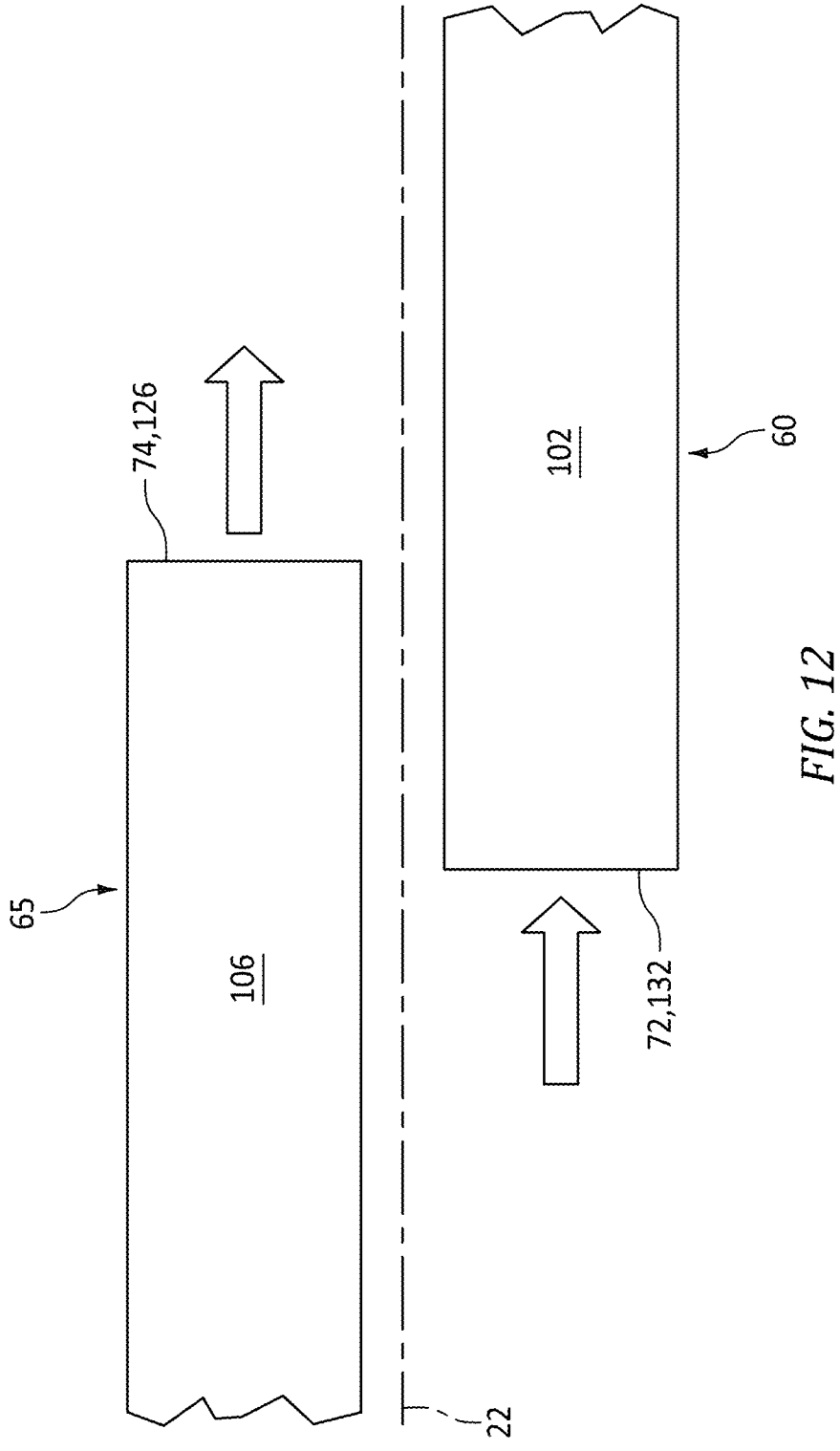
FIG. 12 is a schematic illustration of a portion of an inlet section axially overlapping a portion of the exhaust section.

In some embodiments, referring to FIG. 1, the flowpath inlet 72 and its airflow inlet(s) 132 may be located axially aft and downstream of (relative to flow outside of the aircraft propulsion system 20) the flowpath exhaust 74 and its exhaust outlet(s) 126. In other embodiments, referring to FIG. 12, the flowpath inlet 72 and its airflow inlet(s) 132 may be axially aligned with or located axially forward and upstream of (relative to flow outside of the aircraft propulsion system) the flowpath exhaust 74 and its exhaust outlet(s) 126. With this arrangement, the flowpath inlet 72 and its airflow inlet(s) 132 may receive (e.g., fresh) ambient air with little or none of the combustion products exhausted from the flowpath exhaust 74 and its exhaust outlet(s) 126.

Figure 13:
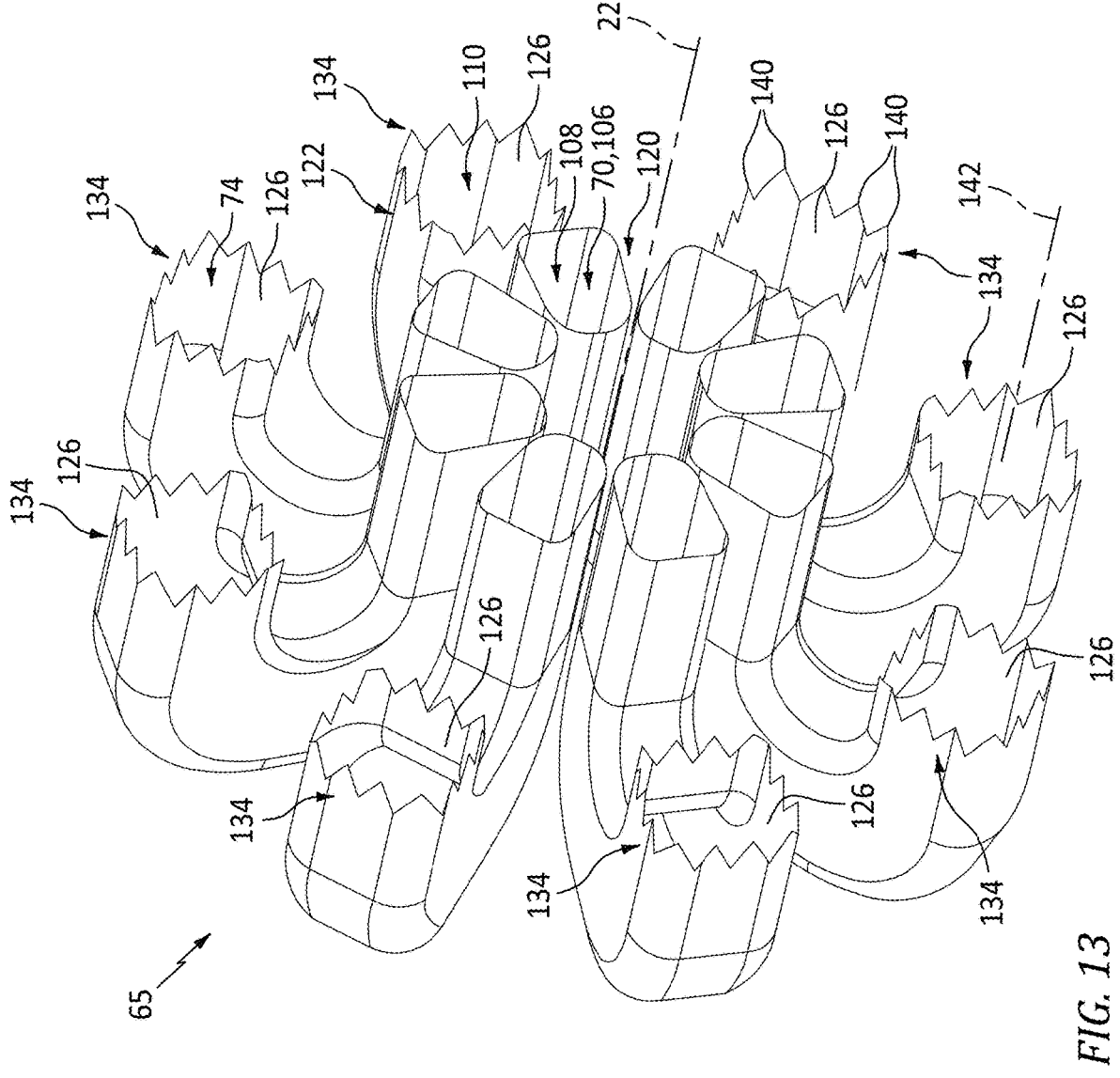
FIGS. 13-15 are perspective illustrations of the exhaust section with various exhaust mixer arrangements.
Figure 14:
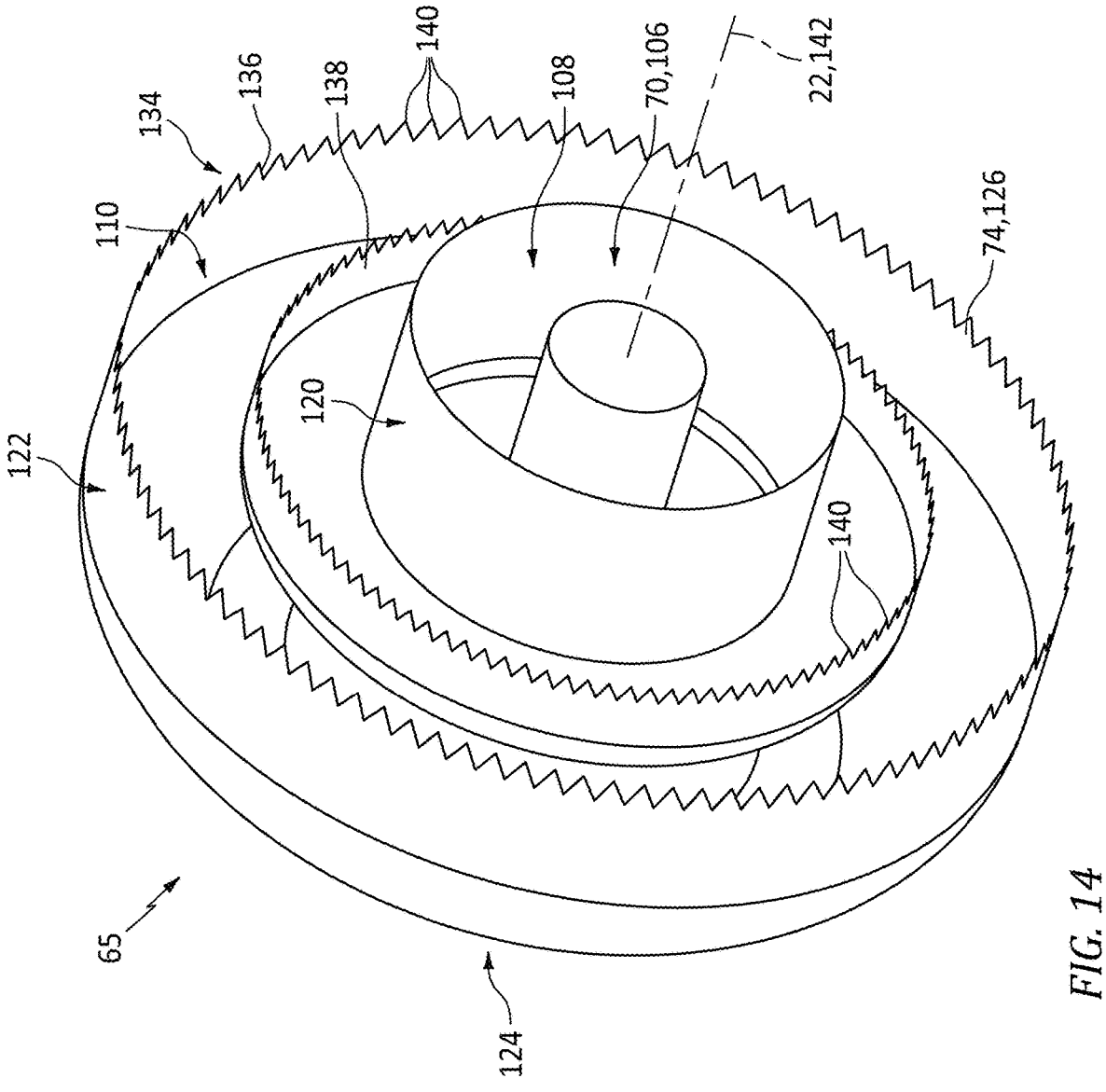
Figure 15:
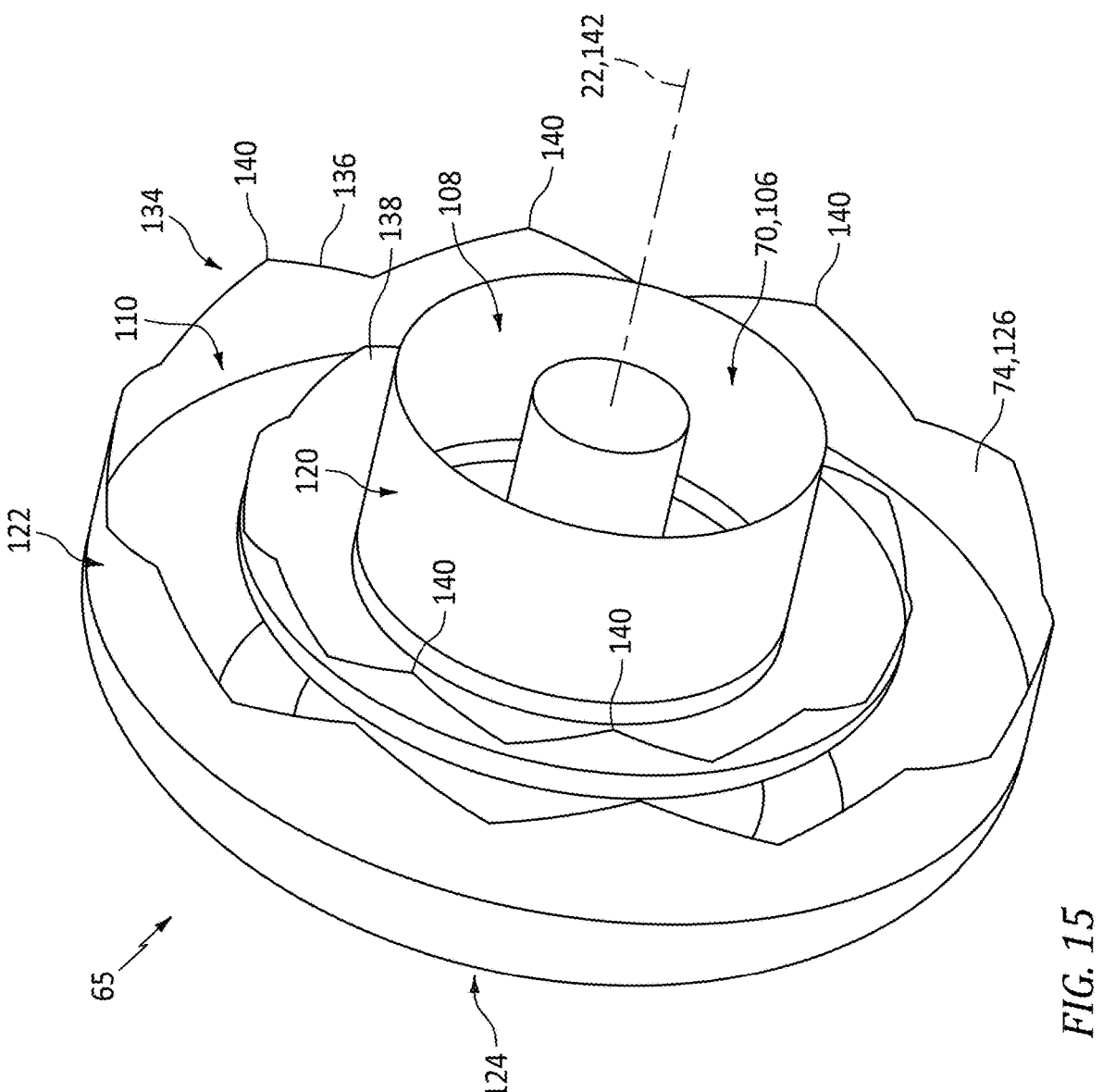

In some embodiments, referring to FIGS. 13-15, the exhaust section 65 may be configured with one or more exhaust mixers 134. These one or more exhaust mixers 134 may be attached to or integrated with the outer duct(s) 122 to partially or completely form the flowpath exhaust 74. Each exhaust mixer 134 of FIGS. 13-15, for example, is located at and may partially or completely form a respective exhaust outlet 126. More particularly, each exhaust mixer 134 in FIG. 13 (e.g., completely) forms an outer peripheral boundary of the respective exhaust outlet 126. An outer mixing structure 136 of the exhaust mixer 134 of FIGS. 14 and 15 (e.g., completely) forms an outer peripheral boundary of the exhaust outlet 126. Similarly, an inner mixing structure 138 of the exhaust mixer 134 of FIGS. 14 and 15 (e.g., completely) forms an inner peripheral boundary of the exhaust outlet 126. However, in other embodiments, it is contemplated the exhaust mixer 134 of FIGS. 14 and 15 may be configured without the inner mixing structure 138.

Figure 16:
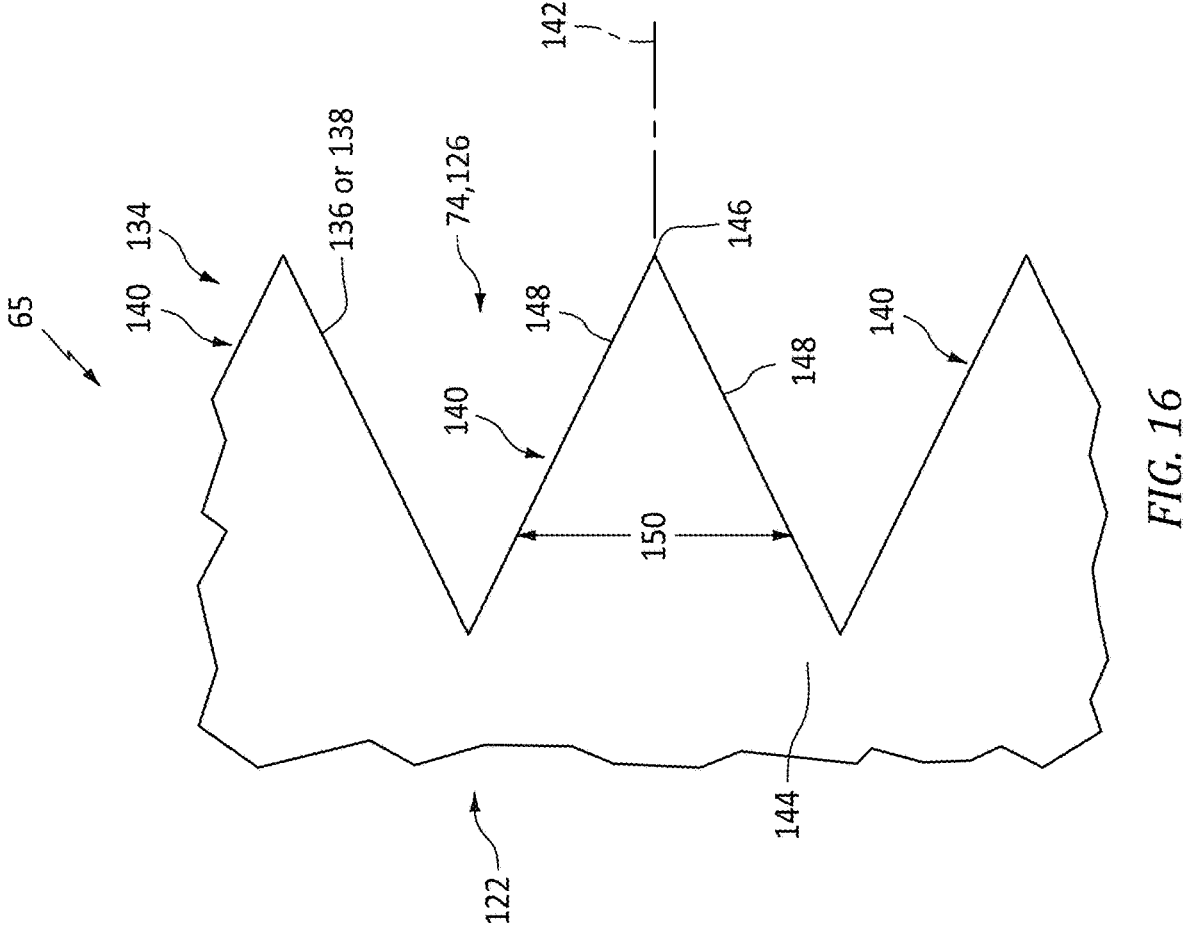
FIG. 16 is a partial side illustration of the exhaust mixer.

The one or more exhaust mixers 134 of FIGS. 13-15 may be configured as chevron mixer(s) and/or serrated edge mixer(s). The present disclosure, however, is not limited to such exemplary exhaust mixer configurations. The one or more exhaust mixers 134, for example, may alternatively be configured as lobed mixer(s) or otherwise. Each exhaust mixer 134 of FIGS. 13-15 includes one or more mixer projections 140; e.g., chevrons, circumferentially tapering elements, etc. These mixer projections 140 are arranged and may (or may not) be equispaced circumferentially along one or more distal downstream edges (e.g., an inner edge and/or an outer edge) forming and extending circumferentially along the respective exhaust outlet 126. Referring to FIG. 16, each mixer projection 140 projects longitudinally along a centerline 142 of the respective outer duct 122 from a base end 144 of the respective mixer projection 140 to a distal tip end 146 of the respective mixer projection 140. Each mixer projection 140 extends laterally (e.g., circumferentially about the centerline 142) between opposing lateral sides 148 of the respective mixer projection 140. Each mixer projection 140 may laterally taper as that mixer projection 140 projects longitudinally towards (e.g., to) its tip end 146. A lateral width 150 of each mixer projection 140 between its opposing lateral sides 148, for example, may decrease in size as the respective mixer projection 140 projects longitudinally out from (or about) its base end 144 to (or about) its tip end 146. With the arrangement of FIGS. 13-15, each exhaust mixer 134 is configured to facilitate mixing of the combustion products exhausted through the respective exhaust outlet 126 with ambient air flowing outside of the aircraft propulsion system; e.g., air propelled by the propulsor rotor 32 of FIG. 1.

In some embodiments, referring to FIGS. 13-15, the mixer projections 140 may be (e.g., symmetrically) arranged along an entire (e.g., inner and/or outer) perimeter of the respective exhaust outlet 126. In other embodiments, the mixer projections 140 may be arranged partially along the (e.g., inner and/or outer) perimeter of the respective exhaust outlet 126 and/or otherwise asymmetrically arranged.

The exhaust mixer(s) 134 are described above as being arranged with an aircraft propulsion system with a tractor, reverse core configuration; e.g., the aircraft propulsion system 20 of FIG. 1. The exhaust mixer(s) 134 of the present disclosure, however, is/are not limited to such an exemplary configuration. The exhaust mixer(s) 134, for example, may alternatively be configured with an aircraft propulsion system with a pusher configuration and/or a forward core configuration. With the pusher configuration, the propulsion section 28 and its propulsor rotor 32 may be arranged at or near the propulsion system aft end 26. With the forward core configuration, at least the arrangement of the engine sections 61-64 may be axially reversed such that the engine flowpath 70 extends forward-to-aft through the turbine engine 30 and its engine core 68. In addition to the foregoing, it is contemplated the PT section 64 may be integrated into the LPT section 63B (e.g., the PT section 64 may be omitted) and rotation of the propulsor rotor 32 may be driven by the rotor 79 (here, a low pressure turbine (LPT) rotor).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:
a propulsion section including an open propulsor rotor and an open guide vane structure disposed next to the open propulsor rotor; and
a turbine engine configured to drive rotation of the open propulsor rotor about an axis, the turbine engine including an engine core, an inlet section, an exhaust section and a flowpath, the engine core including a compressor section, a combustor section and a turbine section, the inlet section comprising a flowpath inlet, the exhaust section comprising a flowpath exhaust and a mixer at the flowpath exhaust, and the flowpath extending from the flowpath inlet, through the inlet section, the compressor section, the combustor section, the turbine section and the exhaust section, to the flowpath exhaust;

wherein the mixer is configured to mix combustion products exhausted from the flowpath through the flowpath exhaust with ambient air outside of the propulsion system;

wherein the flowpath exhaust is formed collectively by a plurality of exhaust outlets; and wherein the mixer is one of a plurality of mixers, and each of the plurality of mixers is configured with a respective one of the plurality of exhaust outlets.

2. The propulsion system of claim 1, wherein a first of the plurality of mixers comprises a chevron mixer.

3. The propulsion system of claim 1, wherein a first of the plurality of mixers comprises a serrated edge mixer.

4. The propulsion system of claim 1, wherein the flowpath exhaust comprises a first exhaust outlet of the plurality of exhaust outlets; and a first of the plurality of mixers forms an outer peripheral boundary of the first exhaust outlet.

5. The propulsion system of claim 1, wherein the flowpath exhaust comprises a first exhaust outlet of the plurality of exhaust outlets; and a first of the plurality of mixers includes a plurality of mixer projections arranged circumferentially about the first exhaust outlet.

6. The propulsion system of claim 5, wherein the plurality of mixer projections comprises a plurality of chevrons.

7. The propulsion system of claim 5, wherein the plurality of mixer projections are symmetrically arranged circumferentially about the first exhaust outlet.

8. The propulsion system of claim 5, wherein the exhaust outlet is non-annular.

9. The propulsion system of claim 1, wherein the flowpath exhaust is disposed axially between the open propulsor rotor and the open guide vane structure.

10. The propulsion system of claim 1, wherein the open guide vane structure is disposed axially between the open propulsor rotor and the flowpath exhaust.

11. The propulsion system of claim 1, wherein the turbine section is disposed axially between the compressor section and the open propulsor rotor.

12. The propulsion system of claim 1, wherein the flowpath exhaust is axially aligned with the open guide vane structure.

13. A propulsion system for an aircraft, comprising:

a propulsion section including an open propulsor rotor and an open guide vane structure disposed next to the open propulsor rotor; and a turbine engine configured to drive rotation of the open propulsor rotor about an axis, the turbine engine including an engine core, an inlet section, an exhaust section and a flowpath, the engine core including a compressor section, a combustor section and a turbine section, the inlet section comprising a flowpath inlet, the exhaust section comprising a flowpath exhaust and a mixer at the flowpath exhaust, and the flowpath extending from the flowpath inlet, through the inlet section, the compressor section, the combustor section, the turbine section and the exhaust section, to the flowpath exhaust;

wherein the mixer is configured to mix combustion products exhausted from the flowpath through the flowpath exhaust with ambient air outside of the propulsion system; and wherein the flowpath exhaust is axially aligned with the open guide vane structure.

14. A propulsion system for an aircraft, comprising:

a propulsion section comprising a propulsor rotor, wherein the propulsor rotor comprises an open propulsor rotor, and the propulsion section further comprises a guide vane structure axially next to and downstream of the propulsor rotor;

a compressor section;

a combustor section;

a first turbine section;

a second turbine section configured to drive rotation of the propulsor rotor about an axis;

an exhaust section including a plurality of exhaust outlets and a plurality of mixers, the plurality of exhaust outlets arranged circumferentially about the axis, and each of the plurality of mixers located at a respective one of the plurality of exhaust outlets to mix combustion products exhausted through the respective one of the plurality of exhaust outlets with another flow of air; and a flowpath extending from a flowpath inlet, through the compressor section, the combustor section, the first turbine section, the second turbine section and the exhaust section, to the plurality of exhaust outlets.

* * * * *